US009263201B2

(12) United States Patent
Pan

(10) Patent No.: US 9,263,201 B2
(45) Date of Patent: Feb. 16, 2016

(54) PLANETARY LIMIT SWITCH

(71) Applicant: I-Te Pan, Taichung (TW)

(72) Inventor: I-Te Pan, Taichung (TW)

( * ) Notice: Subject to any disclaimer, the term of this patent is extended or adjusted under 35 U.S.C. 154(b) by 289 days.

(21) Appl. No.: 13/966,289

(22) Filed: Aug. 14, 2013

(65) Prior Publication Data

US 2015/0047953 A1 Feb. 19, 2015

(30) Foreign Application Priority Data

Jun. 19, 2013 (TW) .............................. 102211427 U

(51) Int. Cl.
*H01H 3/40* (2006.01)
*H01H 3/16* (2006.01)
*F16H 57/08* (2006.01)

(52) U.S. Cl.
CPC ................. *H01H 3/16* (2013.01); *F16H 57/08* (2013.01); *H01H 3/40* (2013.01)

(58) Field of Classification Search
CPC ........... H01H 3/16; H01H 3/40; H01H 19/18; F16H 1/46
See application file for complete search history.

(56) References Cited

U.S. PATENT DOCUMENTS 5,104,360 A * 4/1992 Wientke et al. ............... 474/152
5,452,643 A * 9/1995 Smith et al. ..................... 91/382
6,244,984 B1 * 6/2001 Dieterich ....................... 475/263

* cited by examiner

*Primary Examiner* — Sherry Estremsky

(57) ABSTRACT

A planetary limit switch contains a front transmission module, at least one following transmission module, and at least one micro switch. The front transmission module couples with an external power source and includes a first planetary gear carrier and plural first planetary gears for matching with the first planetary gear carrier, a front driving gear meshes with the plural first planetary gears and connects with a driving shaft so as to be driven by the driving shaft. Each following transmission module includes a second planetary gear carrier and a plurality of second planetary gears, and the plurality of second planetary gears meshing with a following gear, wherein the second planetary gear carrier has a cam portion arranged on an outer peripheral side thereof. The at least one micro switch is fixed below at least one following transmission module and touched by the cam portion of the second planetary gear carrier.

7 Claims, 10 Drawing Sheets

PLANETARY LIMIT SWITCH

FIELD OF THE INVENTION

The present invention relates to a planetary limit switch.

BACKGROUND OF THE INVENTION

A conventional switch gear disclosed in U.S. Pat. No. 6,244,984 contains a housing 2, and the housing 2 has a rotatable driving gear 6 for driving a drive shaft 5, a sun gear 9, and a clutch gear 10, wherein a coaxially hollow gear 13 and an inner gear 14 mesh with at least one planetary gear 12 and two cam discs 15, wherein a number of inner teeth 16 of each cam disc 1 is larger than a number of teeth of the inner gear 14, and the each cam disc 15 has two controlling cams 17 for touching an electrical switch. However, such a conventional switch gear cannot be adjusted at a larger velocity ratio and has complicated structure.

The present invention has arisen to mitigate and/or obviate the afore-described disadvantages.

SUMMARY OF THE INVENTION

The primary object of the present invention is to provide a planetary limit switch which is capable of overcoming the shortcomings of the conventional planetary limit switch.

To obtain the above objective, a planetary limit switch provided by the present invention contains: a front transmission module, at least one following transmission module, and at least one micro switch.

The front transmission module couples with an external power source and includes a first planetary gear carrier and a plurality of first planetary gears for matching with the first planetary gear carrier, wherein a front driving gear meshes with the plurality of first planetary gears and connects with a driving shaft so as to be driven by the driving shaft.

The at least one following transmission module includes a second planetary gear carrier and a plurality of second planetary gears, and the plurality of second planetary gears meshes with a following gear, wherein the second planetary gear carrier has a cam portion arranged on an outer peripheral side thereof;

The at least one micro switch is fixed below at least one following transmission module and touched by the cam portion of the second planetary gear carrier.

Thereby, the planetary limit switch has fewer components and obtains larger velocity ratio. The at least one plastic screw is rotated to adjust the at least one following transmission module easily. The second tooth disc is fixed in the housing securely. The front transmission module and the at least one following transmission module are designed modularly, so gear ratio is increased easily by adding one following transmission module.

In addition, the first tooth disc and the second tooth disc are shareable without being fixed by the at least one plastic screw.

DETAILED DESCRIPTION OF THE PREFERRED EMBODIMENTS

Figure 1:
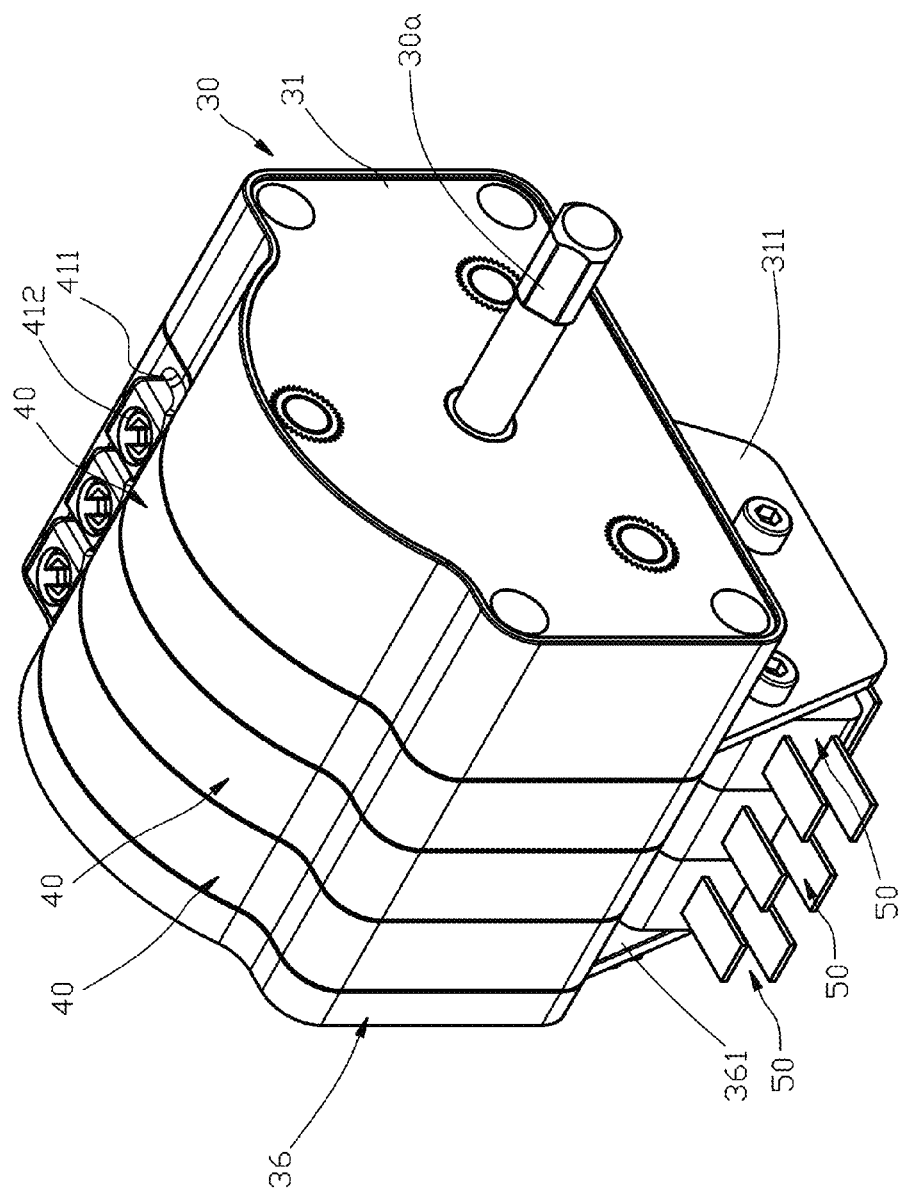
FIG. 1 is a perspective view showing the assembly of a planetary limit switch according to a preferred embodiment of the present invention.
Figure 2:
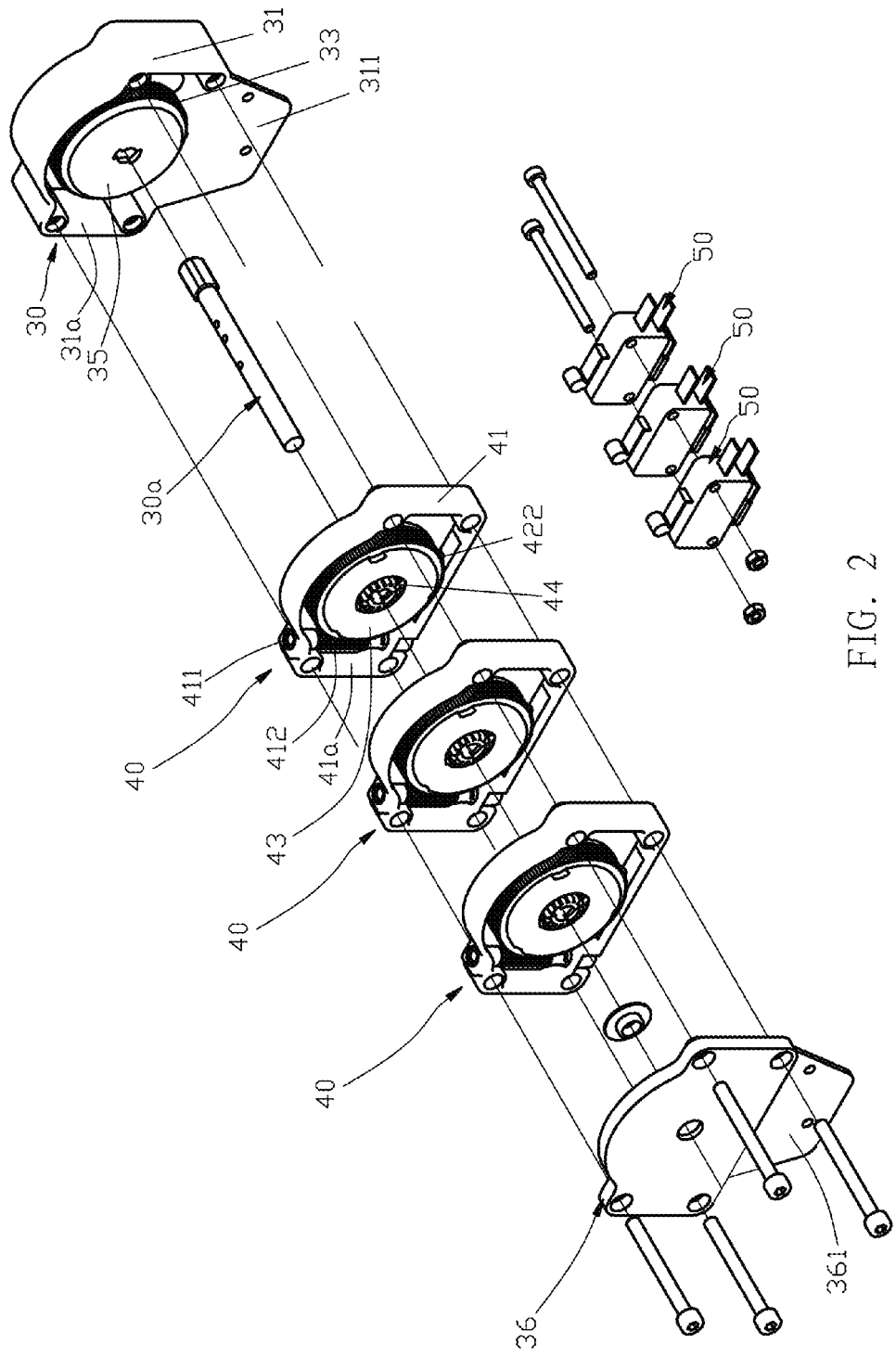
FIG. 2 is a perspective view showing the exploded components of the planetary limit switch according to the preferred embodiment of the present invention.
Figure 8:
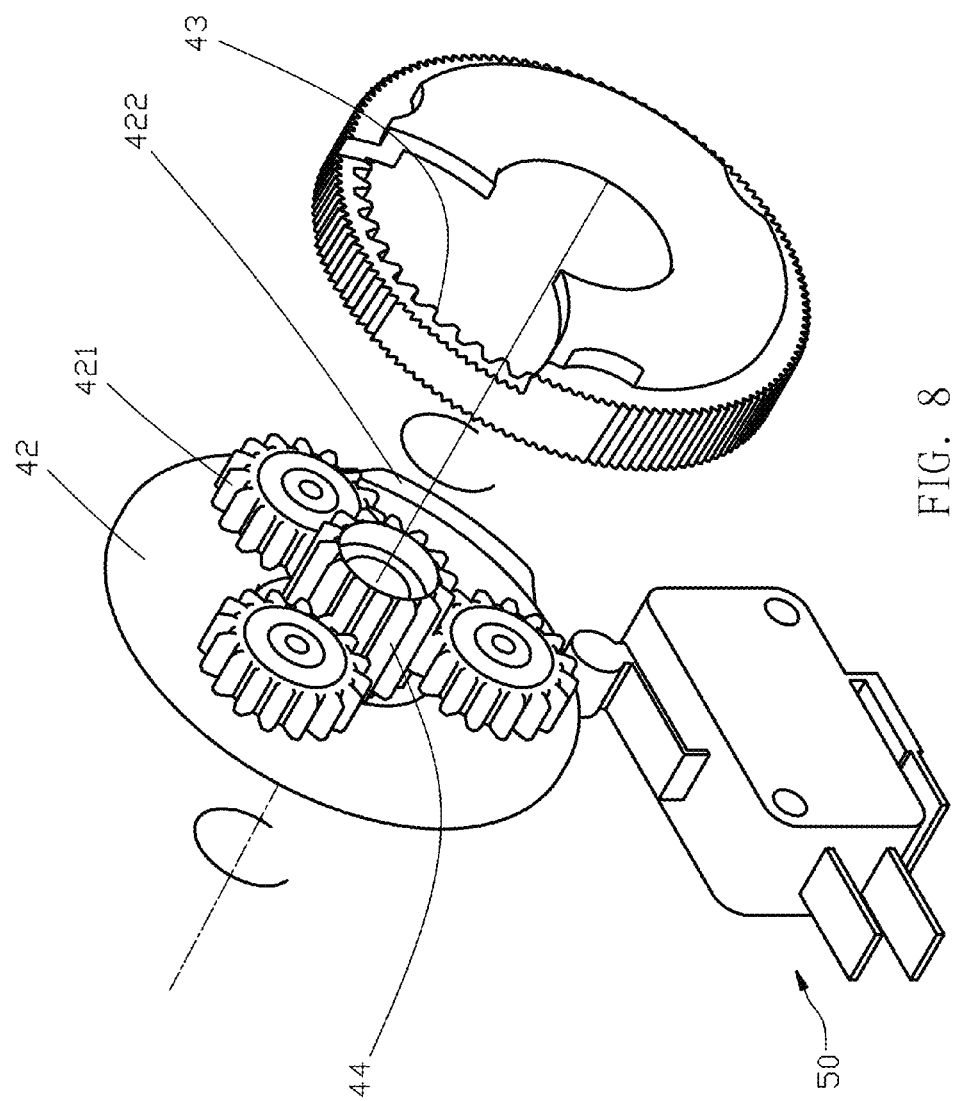
FIG. 8 is also another perspective view showing the operation of the planetary limit switch according to the preferred embodiment of the present invention.

With reference to FIGS. 1, 2 and 8, a planetary limit switch according to a preferred embodiment of the present invention is applied in crane equipment 20 of working high above the ground and comprises: a front transmission module 30, at least one following transmission module 40, and at least one micro switch 50. The front transmission module 30 and the at least one following transmission module 40 are connected together by using a driving shaft 30a, and a front end of the driving shaft 30a exposes outsides the front transmission module 30 and couples with an external power source resulting from the crane equipment 20 which is decelerated its speed.

Figure 3:
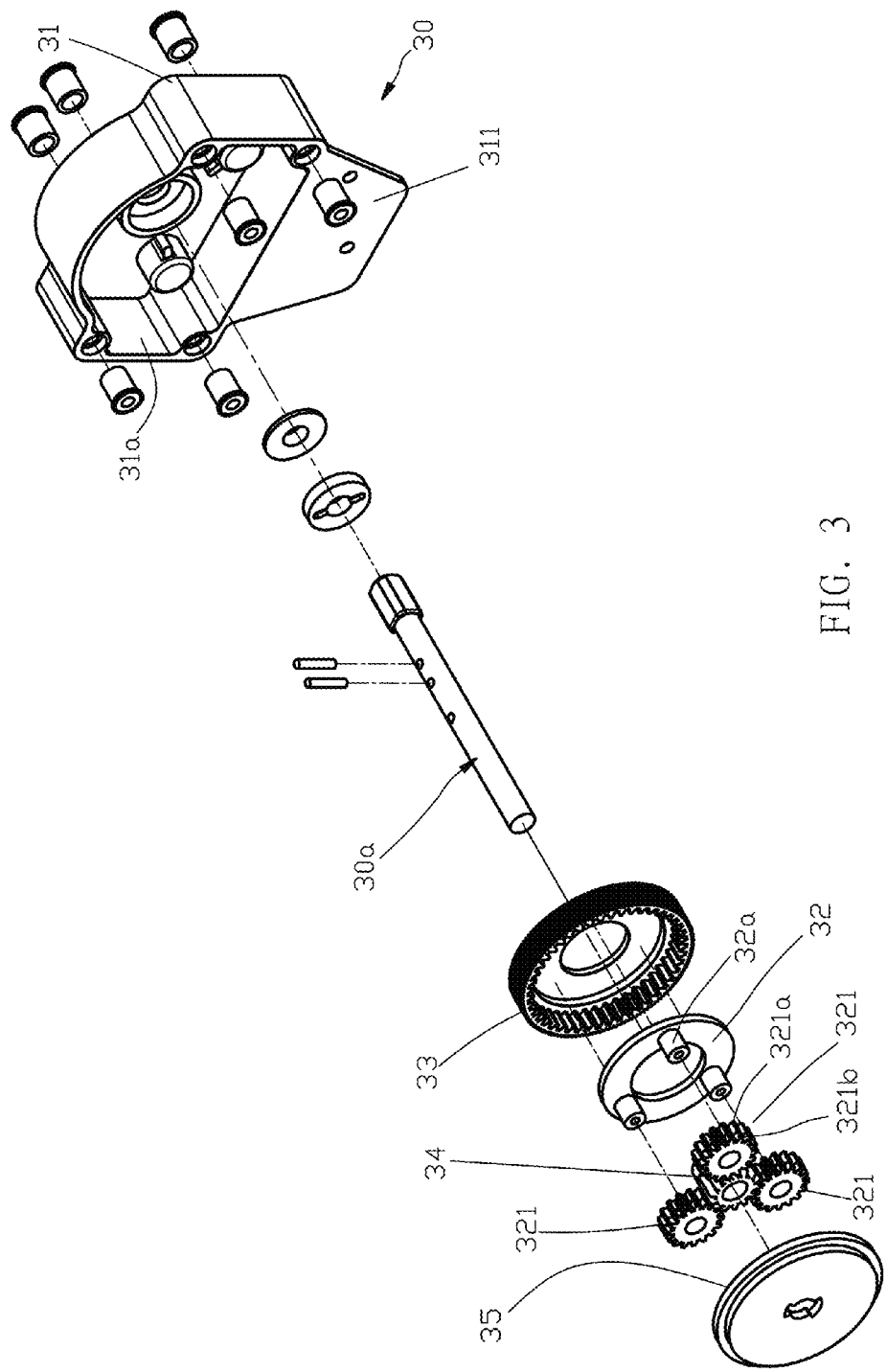
FIG. 3 is a perspective view showing the exploded components of a front transmission module of the planetary limit switch according to the preferred embodiment of the present invention.

As shown in FIG. 3, the front transmission module 30 includes a front cover 31 with a receiving chamber 31a and includes a rear cover 36, and the receiving chamber 31a of the front cover 31 has a first planetary gear carrier 32 and three first planetary gears 321 for matching with the first planetary gear carrier 32, wherein each first planetary gear 321 has a front gear 321a and a rear gear 321b, the front gear 321a meshes with a first tooth disc 33, and the rear gear 321b meshes with a circularly front gear 35; the first planetary gear carrier 32 is hollow and has three first posts 32a extending outwardly from a circumferential surface thereof and cooperating with the three first planetary gears 321, and a front driving gear 34 meshes with the three first planetary gears 321 and connects with the driving shaft 30a so as to be driven by the driving shaft 30a; the front driving gear 34 connects with the circularly front gear 35 and meshes with three rear gears 321b of the three first planetary gears 321; the front cover 31 has a first fixing plate 311 extending downwardly from a bottom side thereof, and the rear cover 36 has a second fixing plate 361 extending outwardly from a bottom side thereof so that the micro switch 53 is defined between the first fixing plate 311 and the second fixing plate 361.

Figure 4:
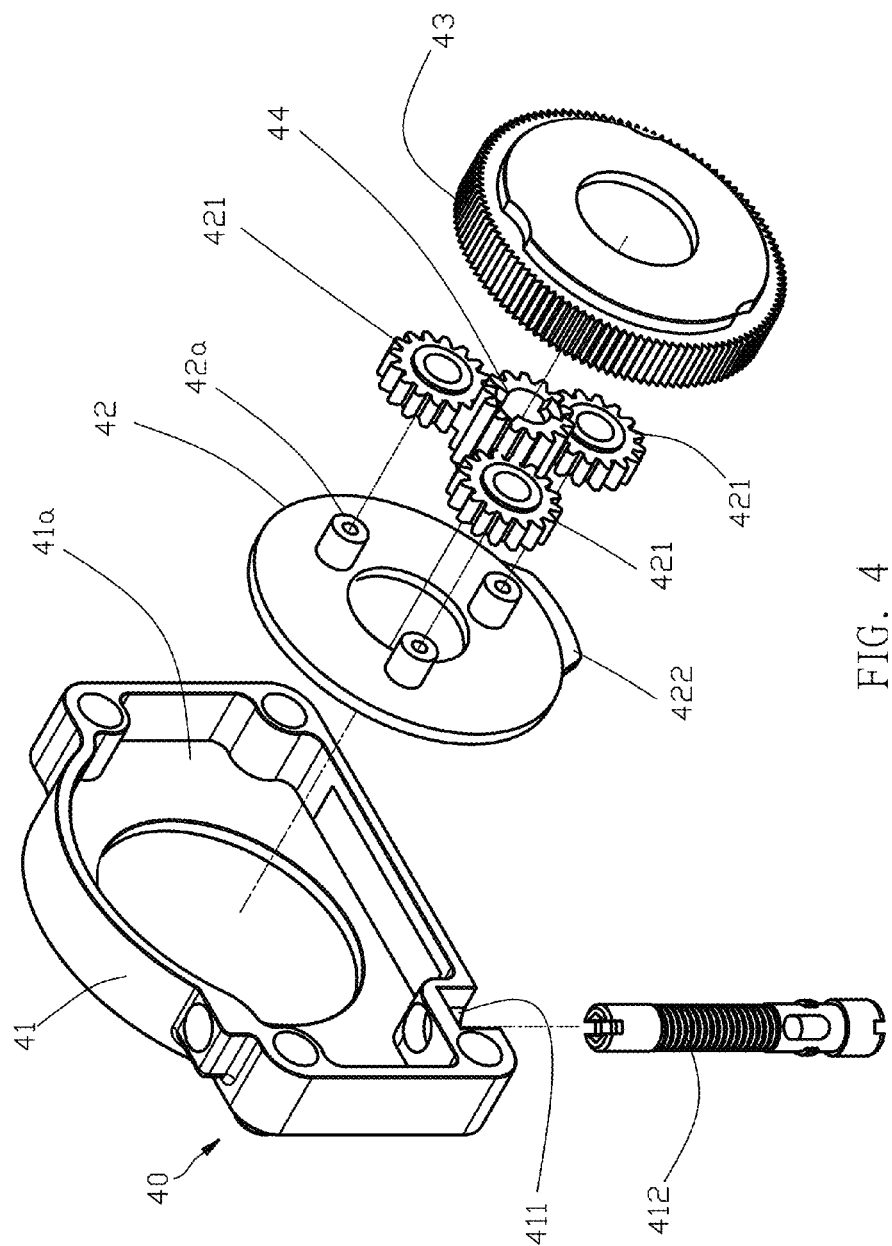
FIG. 4 is a perspective view showing the exploded components of a following transmission module of the planetary limit switch according to the preferred embodiment of the present invention.
Figure 5:
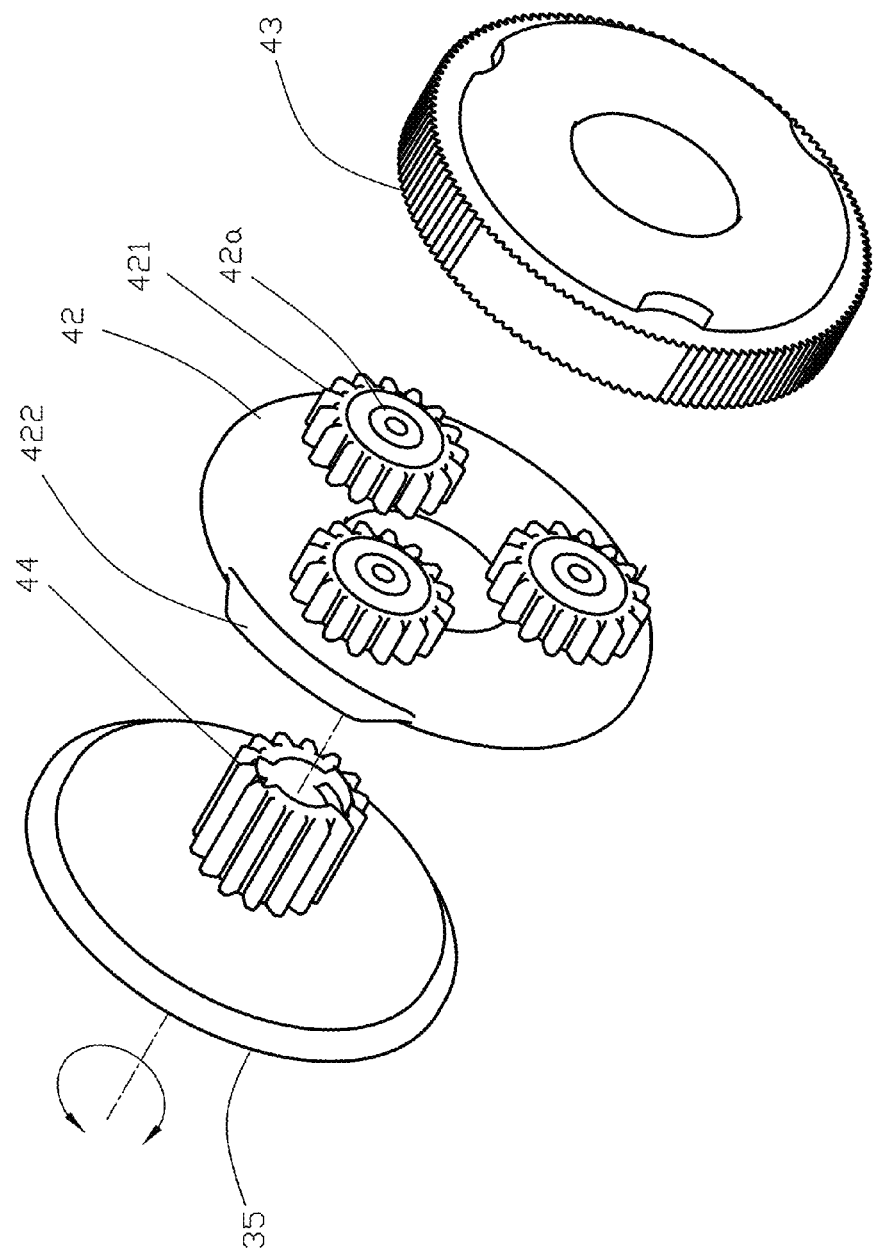
FIG. 5 is a perspective view showing the operation of the planetary limit switch according to the preferred embodiment of the present invention.

Referring further to FIG. 4, each following transmission module 40 includes a housing 41 with a groove 41a, and the housing 41 has at least one threaded seat 411 defined on one side thereof and the at least one plastic screw 412 screwed with the least one threaded seat 411, the groove 41a is used to receive three second planetary gears 421 mounted on the second planetary gear carrier 42 and meshing with a second tooth disc 43, wherein the second planetary gear carrier 42 is hollow and has three second posts 42a extending outwardly from a circumferential surface thereof and cooperating with the three second planetary gears 421, and a following gear 44 meshes with the three second planetary gears 421 as illustrated in FIG. 5, one end of the following gear 44 couples with the circularly front gear 35 of the front transmission module 30 so as to obtain a velocity ratio; the second planetary gear carrier 42 has a cam portion 422 arranged on an outer peripheral side thereof and driven by the at least one micro switch 50; the second tooth disc 43 is fixed by the at least one plastic screw 412, such that the at least one following transmission module 40 is connected with the front transmission module 30.

As illustrated in FIGS. 2, 3, and 5, in operation, the external power source coupling with the front end of the driving shaft 30a drives the front driving gear 34 to rotate (i.e., the front driving gear 34 drives the three first planetary gears 321), three front gears 321a mesh with the first tooth disc 33, and the three rear gears 321b mesh with the circularly front gear 35, hence the three front gears 321a of the first planetary gears 321 carry the first planetary gear carrier 32 to rotate around the first tooth disc 33, and different teeth of the three rear gears 321b drive the circularly front gear 35 to rotate, thus obtaining a larger velocity ratio. Thereafter, the circularly front gear 35 rotates to drive the at least one following transmission module 40. Referring further to FIGS. 4 and 5, the second tooth disc 43 is fixed into the at least one following transmission module 40 by the at least one plastic screw 412. Since the circularly front gear 35 and the following gear 44 rotate simultaneously, the three second planetary gears 421 mesh with the following gear 44, so the three second planetary gears 421 carry the second planetary gear carrier 42 to rotate around the second tooth disc 43; and then the following gear 44 passes a power to next following transmission module 40, thereby achieving a velocity ratio.

Figure 6:
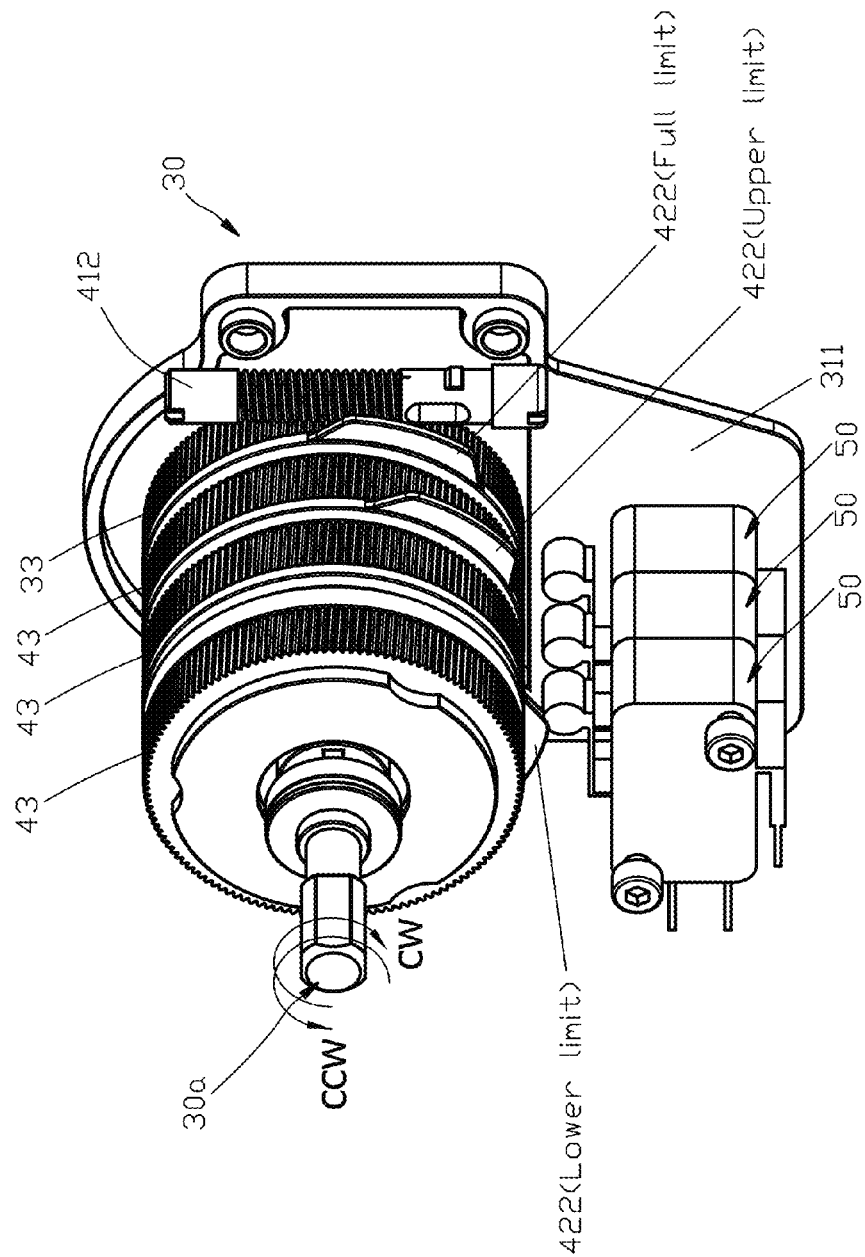
FIG. 6 is a perspective view showing the assembly of a part of the planetary limit switch according to the preferred embodiment of the present invention.
Figure 7:
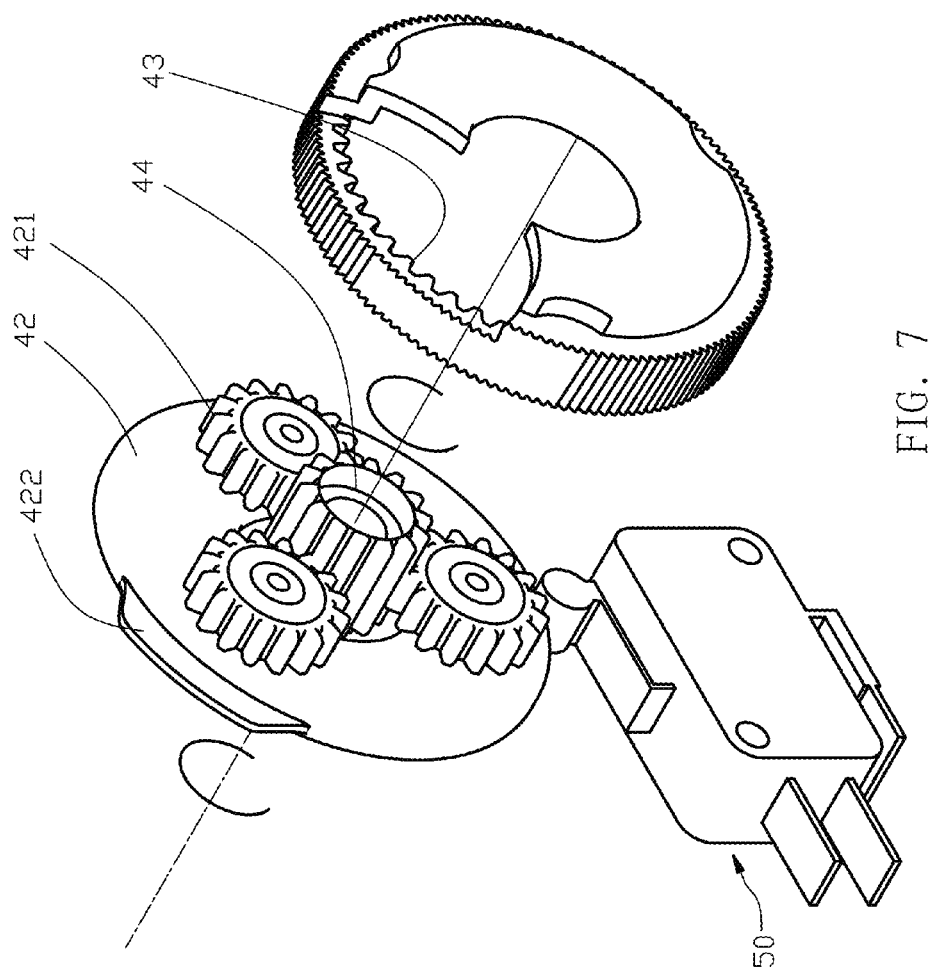
FIG. 7 is another perspective view showing the operation of the planetary limit switch according to the preferred embodiment of the present invention.

As shown in FIGS. 6-8, a velocity ratio generates from the next following transmission module 40 so that the cam portion 422 of the second planetary gear carrier 42 touches one of the at least one micro switch 50. As illustrated in FIG. 7, when the driving shaft 30a rotates counterclockwisely, the following gear 44 drives the three second planetary gears 421 to rotate along the second tooth disc 43, thereafter the three second planetary gears 421 carry the second planetary gear carrier 42 to rotate until a lower limit touches one of the at least one micro switch 50 which corresponds to the lower limit. Referring further to FIG. 8, when the driving shaft 30a rotates clockwisely, the following gear 44 drives the three second planetary gears 421 rotates along the second tooth disc 43, thereafter the three second planetary gears 421 carry the second planetary gear carrier 42 to rotate until an upper limit touches one of the at least one micro switch 50 which corresponds to the upper limit. After the driving shaft 30a rotates clockwisely, if the upper limit cannot touch one of the at least one micro switch 50 which corresponds to the upper limit and moves upward continuously, the three second planetary gears 421 carry the second planetary gear carrier 42 to rotate until an full limit touches one of the at least one micro switch 50 which corresponds to the full limit, thus having safe protection.

Figure 9:
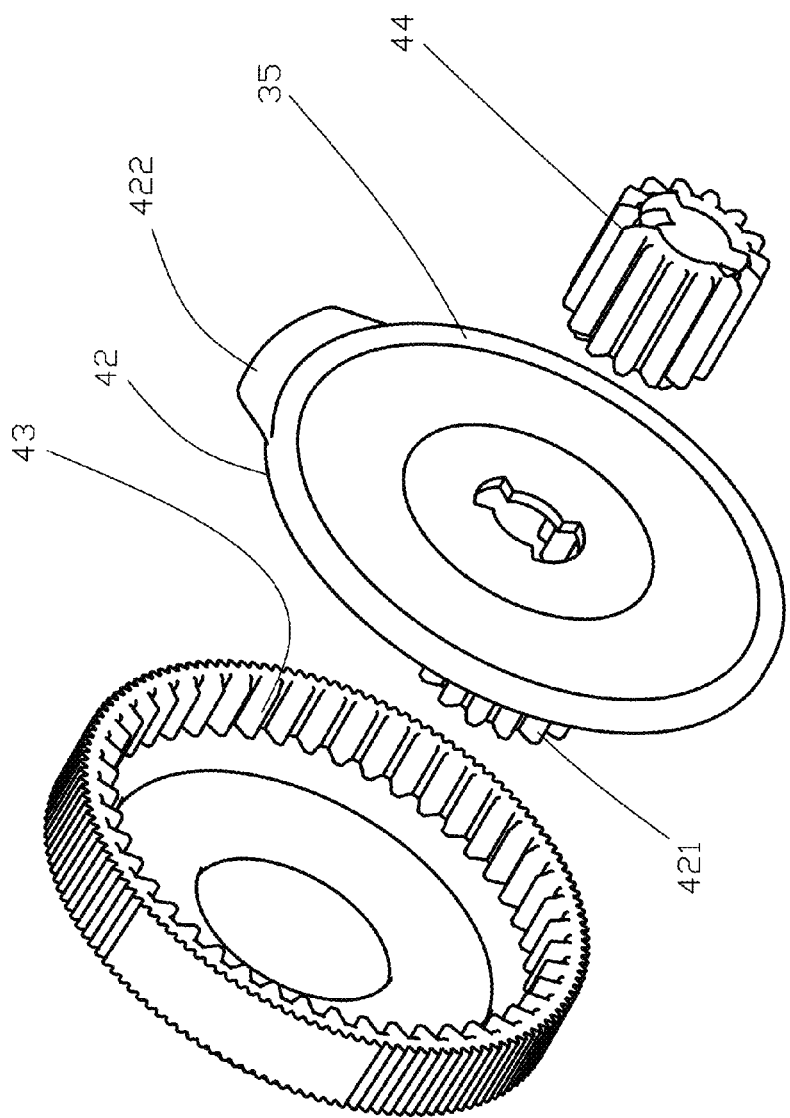
FIG. 9 is still another perspective view showing the operation of the planetary limit switch according to the preferred embodiment of the present invention.
Figure 10:
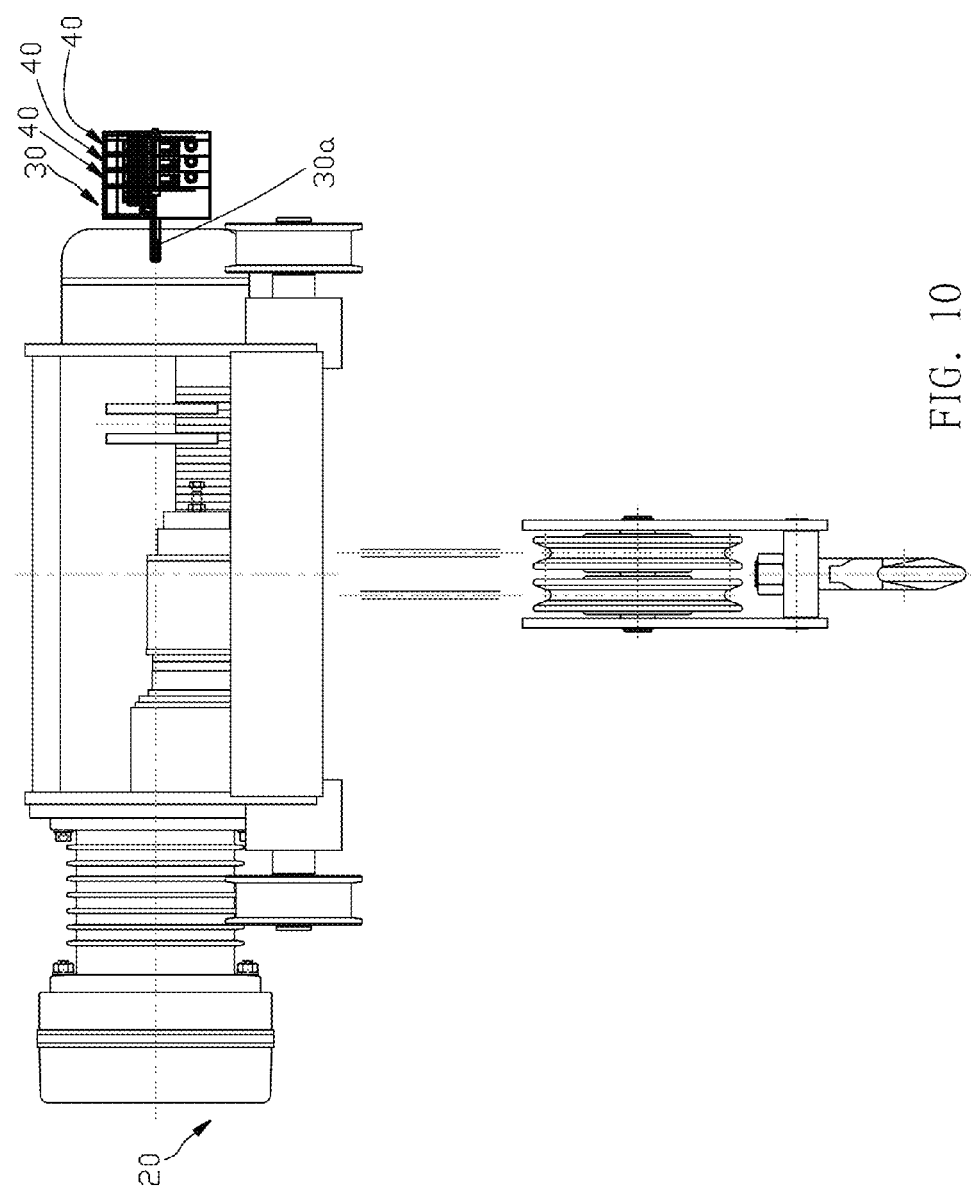
FIG. 10 is a plan view showing the application of the planetary limit switch according to the preferred embodiment of the present invention.

As desiring to increase a gear ratio as shown in FIG. 9, the following gear 44 is fixed on the second planetary gear carrier 42 located at a middle layer. After fixing three layers of the second planetary gear carriers 42, the following gear 44 is fitted directly, thus obtaining a fixed velocity ratio. As desiring to increase the velocity ratio after the three layers of the second planetary gear carriers 42, the following gear 44 is fitted to the second tooth disc 43.

Thereby, the planetary limit switch has fewer components and obtains larger velocity ratio. The at least one plastic screw 412 is rotated to adjust the at least one following transmission module 40 easily. The second tooth disc 43 is fixed in the housing 41 securely. The front transmission module 30 and the at least one following transmission module 40 are designed modularly, so gear ratio is increased easily by adding one following transmission module 40. In addition, the first tooth disc 33 and the second tooth disc 43 are shareable without being fixed by the at least one plastic screw 412.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A planetary limit switch comprising:
   a front transmission module coupling with an external power source and including a first planetary gear carrier and a plurality of first planetary gears for matching with the first planetary gear carrier, wherein a front driving gear meshes with the plurality of first planetary gears and connects with a driving shaft so as to be driven by the driving shaft;
   at least one following transmission module including a second planetary gear carrier and a plurality of second planetary gears, and the plurality of second planetary gears meshing with a following gear, wherein the second planetary gear carrier has a cam portion arranged on an outer peripheral side thereof;
   at least one micro switch fixed below at least one following transmission module and touched by the cam portion of the second planetary gear carrier.

2. The planetary limit switch as claimed in claim 1, wherein the front transmission module includes a front cover with a receiving chamber and includes a rear cover, the front cover has a first fixing plate extending downwardly from a bottom side thereof, and the rear cover has a second fixing plate extending outwardly from a bottom side thereof so that the micro switch is defined between the first fixing plate and the second fixing plate.

3. The planetary limit switch as claimed in claim 1, wherein a front end of the driving shaft exposes outsides the front transmission module and couples with the external power source.

4. The planetary limit switch as claimed in claim 3, wherein a number of the at least one following transmission module is three.

5. The planetary limit switch as claimed in claim 1, wherein each first planetary gear has a front gear and a rear gear, the front gear meshes with a first tooth disc, and the rear gear meshes with a circularly front gear.

6. The planetary limit switch as claimed in claim 1, wherein the first planetary gear carrier is hollow and has three first posts extending outwardly from a circumferential surface thereof and cooperating with the three first planetary gears, the second planetary gear carrier is hollow and has three second posts extending outwardly from a circumferential surface thereof and cooperating with the three second planetary gears.

7. The planetary limit switch as claimed in claim 1, wherein one end of the following gear couples with a circularly front gear of the front transmission module so as to obtain a velocity ratio.

* * * * *